US012646400B1

(12) United States Patent
Khmelev et al.

(10) Patent No.: US 12,646,400 B1
(45) **Date of Patent: *Jun. 2, 2026**

(54) SECURITY SHARING SYSTEMS AND METHODS

(71) Applicant: United Services Automobile Association (USAA), San Antonio, TX (US)

(72) Inventors: Yevgeniy Viatcheslavovich Khmelev, San Antonio, TX (US); Oscar Guerra, San Antonio, TX (US); Jeffrey Neal Pollack, San Antonio, TX (US); Janelle Denice Dziuk, Falls City, TX (US); Ashley Raine Philbrick, San Antonio, TX (US); Ryan Thomas Russell, San Antonio, TX (US); David Patrick Dixon, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 186 days.

This patent is subject to a terminal disclaimer.

(21) Appl. No.: 18/394,250

(22) Filed: Dec. 22, 2023

Related U.S. Application Data

(63) Continuation of application No. 17/751,041, filed on May 23, 2022, now Pat. No. 11,854,370, which is a continuation of application No. 16/845,902, filed on Apr. 10, 2020, now Pat. No. 11,341,838.

(60) Provisional application No. 62/832,596, filed on Apr. 11, 2019.

(51) Int. Cl.
*G08B 25/00* (2006.01)
*G08B 25/08* (2006.01)

(52) U.S. Cl.
CPC ......... *G08B 25/006* (2013.01); *G08B 25/007* (2013.01); *G08B 25/085* (2013.01)

(58) Field of Classification Search
CPC ............................. G06F 21/10; G06F 11/0709
USPC .......................................................... 340/500
See application file for complete search history.

(56) References Cited

U.S. PATENT DOCUMENTS 5,920,270 A 7/1999 Peterson
2008/0320552 A1* 12/2008 Kumar ................ H04L 63/1433 726/1
2011/0298608 A1 12/2011 Ranjan et al.
2012/0204222 A1* 8/2012 Bodi ..................... H04L 63/105 726/1
2013/0278414 A1 10/2013 Sprigg et al.
2015/0163121 A1* 6/2015 Mahaffey .............. H04L 41/142 707/687
2019/0095990 A1 3/2019 Sarir et al.
2020/0074841 A1 3/2020 Kazi et al.
2020/0151360 A1 5/2020 Zavesky et al.
2020/0202024 A1 6/2020 Chen
(Continued)

*Primary Examiner* — Fabricio R Murillo Garcia
(74) *Attorney, Agent, or Firm* — Fletcher Yoder, P.C.

(57) ABSTRACT

A method may include receiving an alert and a recorded data set from a first monitoring system and receiving a first set of permissions from the first monitoring system. The method may also include determining a permission associated with sharing of the recorded data set based at least in part on the first set of permissions. The method may also include determining that sharing of at least a portion of the recorded data from the first monitoring system is permitted based at least in part on the permission and sharing the at least a portion of the recorded data set.

20 Claims, 3 Drawing Sheets

(56) References Cited

U.S. PATENT DOCUMENTS

| | | | |
|---|---|---|---|
| 2020/0236143 | A1 | 7/2020 | Zou et al. |
| 2020/0273268 | A1 | 8/2020 | Bhattacharyya et al. |
| 2020/0312047 | A1 | 10/2020 | Goluguri et al. |

* cited by examiner

SECURITY SHARING SYSTEMS AND METHODS

CROSS-REFERENCE TO RELATED APPLICATION

This application claims priority to U.S. application Ser. No. 17/751,041, filed May 23, 2022, entitled "SECURITY SHARING SYSTEMS AND METHODS," which claims priority to U.S. application Ser. No. 16/845,902, filed Apr. 10, 2020, entitled "SECURITY SHARING SYSTEMS AND METHODS," which claims priority to and the benefit of U.S. Provisional Application No. 62/832,596, entitled "SECURITY SHARING SYSTEMS AND METHODS," filed Apr. 11, 2019, each of which is incorporated herein by reference in its entirety.

BACKGROUND

The present disclosure generally relates to home automation and monitoring, and more particularly, data sharing between home automation and/or home monitoring devices.

Home automation and/or monitoring electronic devices, such as video-enabled doorbells, camera or video-enabled toys, motion detecting electronic devices, audio detecting electronic devices, or the like, are sometimes positioned within and/or around homes in neighborhoods, or within and/or around communities (e.g., in public shopping areas, such as a security video camera). Further, these devices increasingly use artificial intelligence, machine learning, and/or other analysis techniques to analyze image data, video data, audio data, and/or other sensor data gathered (e.g., recorded data set(s)), and determine from the analysis whether activity is occurring within the monitored area. However these devices do not yet communicate with devices not owned by a common entity. For example, a device owned by a first operator does not communicate with a device owned by a second operator. Consequently, abnormal patterns, alerts, and/or monitoring data are inefficiently used to monitor a home and/or a community space because there is no way to automatically aggregate monitoring data, nor provide a platform for automatic and collective analysis of the aggregated data.

BRIEF DESCRIPTION

Certain embodiments commensurate in scope with the originally claimed subject matter are summarized below. These embodiments are not intended to limit the scope of the claimed invention, but rather these embodiments are intended only to provide a brief summary of possible forms of the invention. Indeed, the present disclosure may encompass a variety of forms that may be similar to or different from the embodiments set forth below.

In an embodiment, a system may include a first monitoring system associated with a first set of data sharing permissions. The system may also include a central control system that receives a first alert from the first monitoring system and determines mutual permissions based at least in part on overlap between the first set of data sharing permissions and a second set of data sharing permissions. The central control system may also determine that sharing a recorded data set between the first monitoring system and a second monitoring system is permitted based at least in part on the mutual permissions. In response to determining that sharing is permitted, the central control system may share the recorded data set by transmitting the recorded data set between the first monitoring system and the second monitoring system.

In another embodiment, a method may include receiving an alert and a recorded data set from a first monitoring system and receiving a first set of permissions from the first monitoring system. The method may include receiving a second set of permissions from a second monitoring system and determining a mutual permission based at least in part on a matching of respective permissions from the first set of permissions and from the second set of permissions. The method may also include determining that sharing of at least a portion of the recorded data between the first monitoring system and the second monitoring system is permitted based at least in part on the mutual permission and sharing the at least a portion of the recorded data set by transmitting the at least a portion of the recorded data set to the second monitoring system.

In yet another embodiment, a system may include a first monitoring system, a second monitoring system, and a central control system. The first monitoring system may be associated with a first set of utility sharing permissions and the second monitoring system may be associated with a second set of utility sharing permissions. The central control system may receive an alert from the first monitoring system; determine mutual permissions based at least in part on overlap between the first set of data sharing permissions and the second set of data sharing permissions; determine that sharing a household asset between the first monitoring system with the second monitoring system is permitted based at least in part on the mutual permissions; and enable a sharing of the household asset between the second monitoring system and the first monitoring system.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
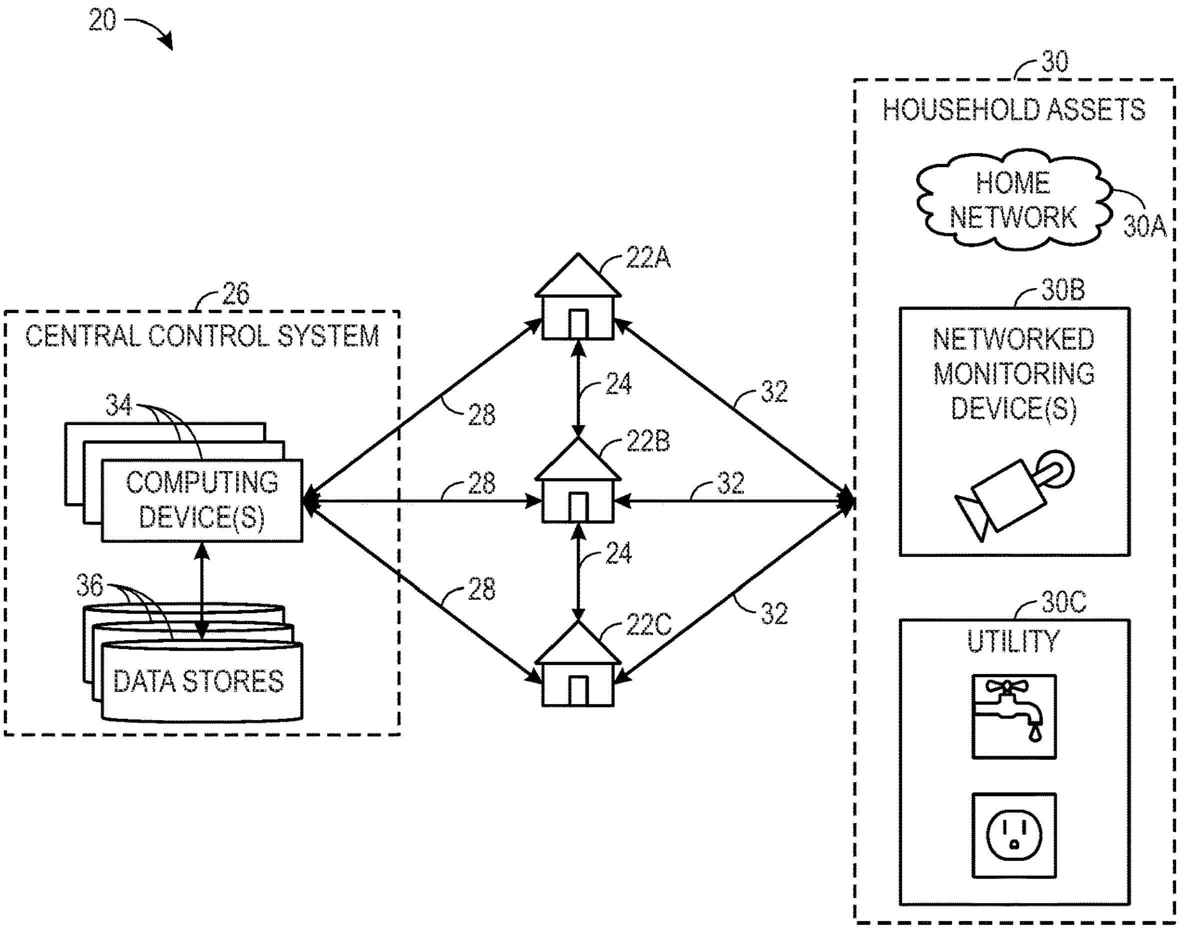
FIG. 1 is a schematic diagram of example household monitoring systems communicatively coupled together to form a community monitoring system, in accordance with embodiments of the present techniques.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Home and business owners may monitor and/or enhance their respective personal properties using electronic networked monitoring devices, such as surveillance cameras, video-enabled doorbells, audio-enabled recording and/or listening devices, smart-enabled outlets, home- or commercial-automation devices, or the like. These networked monitoring devices may communicatively couple to proprietary software and perform operations related to the proprietary software (e.g., a video-enabled doorbell may upload a recorded image in response to an operator instructing the hardware to upload the image to the proprietary software). Furthermore, the networked monitoring devices may couple to a communication network (e.g., wired network, wireless network) and may transmit owned information (recorded data sets, generated alerts, indications of detected activity (e.g., may or may not correspond to an alert, or the like) via the communication network. The owned information may generally refer to data or information gathered via the networked monitoring devices, and thus the data or information gathered may belong to an owner of the networked monitoring device (e.g., owned information).

It may be advantageous to cross-reference owned information between the networked monitoring devices and/or between monitoring systems of networked monitoring devices. Operation and/or monitoring of a home (or business and/or community-region) may improve from this comparison of owned information. For example, operation and/or monitoring of a home may improve from referencing a first recorded data set (or alert) and comparing the first recorded data set (or alert) to a second recorded data set (or alert), where the first and second recorded data sets (or alerts) may be from any of the networked monitoring devices.

The above-described systems and methods may be an improvement to monitoring systems that use networked monitoring devices, such as home automation systems and/or home monitoring systems. Each networked monitoring device may be communicatively coupled to an aggregation software managed by a common provider, referred to herein as a central control system. Activity monitored, and captured in the recorded data sets, via networked monitoring devices of a first monitoring system may be shared with the central control system. It is noted that examples used herein usually refer to recorded data sets and alerts as examples of owned information transmitted to the central control system, but it should be understood that a variety of suitable data may transmit between monitoring systems and the central control system. Each respective networked monitoring device may correspond to sharing preferences (e.g., permissions) that the central control system may interpret to determine mutual permissions between networked monitoring devices and/or between monitoring systems. Permissions of each monitoring system may be established between the central control system and the monitoring system, such as by way of agreement, contract, legal agreement, legal contract, user agreement, or the like. Additionally or alternatively, the permissions may be settings that may change over a lifetime and/or operation duration of the monitoring system, such as in response to a trigger event (e.g., a threshold number of locally-detected events) and/or in response to operator input. Furthermore, occupants of a household, or a household as a whole, may each correspond to a profile maintained for that operator. Each profile may include indications of these permissions. Profiles may also indicate a ranking of priority of household occupants such as to provide a system to provide seniority to defining permissions of a household monitoring system.

The central control system may selectively share the at least a portion of the owned information with a second monitoring system and/or with one or more networked monitoring devices of the second monitoring system. The central control system may reference the permissions of the first monitoring system to determine what information from the first monitoring system to selectively transmit to the second monitoring system. In this way, the central control system may permit information associated with activity monitored, the generated alert, and/or the recorded data sets to transmit to the second monitoring system.

Furthermore, the central control system may aggregate recorded data sets, detected activity, and/or alerts overtime on behalf of the first monitoring system and the second monitoring system. Aggregated data may be respectively associated with one or more properties. The central control system may reference the properties to determine whether an alert pattern and/or a behavior pattern emerged over time. The central control system may transmit control signals and/or notifications to the monitoring systems based on analysis results. In response to receiving a control signal and/or a notification, for example, the monitoring systems may respond to a detected activity and/or generated alerts based at least in part on an analysis performed by the central control system.

The monitoring and the management of the aggregated data over time by the central control system may improve monitoring system technology, such as by providing a vendor agnostic and/or application agnostic monitoring system and/or aggregation system. Monitoring system technology may improve because information owned by respective owners of the different monitoring systems may be used by the central control system without each monitoring system and/or owner providing the recorded data sets, detected activity, and/or generated alerts to the different monitoring systems. Each monitoring system provides permissions and owned information to the central control system for management and use, permitting for more efficient and secure communication of owned information between third-party monitoring systems and/or monitoring systems of a community. Additionally and/or alternatively, use of the monitoring system and/or use of conclusions gleaned from the recorded data sets, the detected activity, and/or the generated alerts may be shared with operators and/or members of a community, regardless of whether the operators and/or members of the community have access to vendor-specific technology, interfaces, and/or applications. For example, certain vendors of a particular monitoring device may permit sharing of footage and/or the recorded data sets generated via the particular monitoring device through a vendor-specific application. This may exclude some community members from accessing that footage and/or recorded data set because when the community members do not have access to the vendor-specific application. However, when one or more community members and monitoring systems of the community are operably coupled to the central control system, each community member may access shared owned information agnostic of vendor, ownership of a monitoring system, of messaging system, of accessible application, or the like.

Owned information sharing may be extended to be shared to police or third-parties of the community. The owned information gathered from the community monitoring system may be shared with "911 systems of the future" or otherwise data-enhanced policing operation within a community. For example, in a data-enhanced policing operation, the community monitoring system may supply community authorities with a portion of owned information (e.g., video footage, a tracked location of a computing device of a nefarious person determined to be within the community, audio recordings, or the like) while a robbery or other abnormal event is ongoing, or after the robbery or other abnormal event has completed as a way to retroactively try to reclaim lost property on behalf of a household. Owned information may additionally or alternatively be shared with applications, software, or the like, such as a device application of a household occupant wanting to further analyze their owned information.

As a particular example, a particular community member may be a person (e.g., who is not technologically savvy) who does not own any monitoring device, and thus is without a monitoring system. This community member may still buy-in, subscribe, or otherwise associate with the central control system to receive alerts, recorded data sets, and/or other suitable owned information from their community based at least in part on the permissions of the community and of the community member. For example, the community member may receive electronic-mail (e-mail), text messages (e.g., Short Message Service (SMS) messages, Rich Communication Service (RCS) messages, or the like), or other notifications from the central control system instead of accessing an application or having owned information delivered to them through relatively more technology-driven ways (e.g., a notification delivered through an internet of things (IoT) device, such as an Alexa or a Google Home product). Thus, the central control system may be an inclusive solution to increase awareness and protection of a community from abnormal, nefarious, or other annoyances or disruptions. In some cases, incentives may be provided to community members with a monitoring device to participate in the community sharing program described above. For example, community members who opt in to the program may have a status included with their respective profiles indicating that they are sharing data with their community, and thus may receive rewards, discounts (e.g., insurance rate discount), or the like based on the presence of the status.

Turning now to the drawings, FIG. 1 is an illustration of an embodiment of a community monitoring system 20 that includes one or more monitoring systems 22 (22A, 22B, 22C) each interconnected. The monitoring systems 22 may interconnect directly to each other (e.g., represented by communicative couplings 24), may interconnect indirectly to each other via a central control system 26 (e.g., represented by communicative couplings 28), may interconnect indirectly to each other via household assets 30 (e.g., such as a home network 30A), networked monitoring devices 30B, power and/or utility lines (e.g., power and/or electricity utility 30C, or the like, as represented by communicative couplings 32), or any combination thereof. Furthermore, monitoring systems 22 may include any suitable type of property owned by a household, such as vehicles enhanced with monitoring devices, households enhanced with monitoring devices, devices enhanced with monitoring capabilities, or the like. The community monitoring system 20 may permit respective monitoring systems 22 to share information between each other, between networked monitoring device(s) 30B, between any suitable household asset 30, or the like, via the central control system 26. The monitoring systems 22 and/or the household assets 30 may react to the shared information, such as by beginning an operation, terminating an operation, performing operations as part of a cutover operation, or the like.

Household assets 30 may also include any suitable non-monitoring device with network connectivity capabilities. In this way, the household assets 30 may include lights, fans, speakers, or the like, that may each interconnect with components of the community monitoring system 20 to form a mesh network of inter-communicating systems and/or devices. For example, a household asset 30 may include a smart outlet (e.g., an outlet outfitted with actuating technology such that an electrical signal to a load of the outlet may be halted, decreased, or terminated in response to a control signal) and/or a smart garage (e.g., a garage door that is able to lock down itself in response to an alert to decrease a likelihood of vehicle theft occurring). In response to the monitoring system 22 receiving shared information from the central control system 26 regarding a nearby stranger identified by a different monitoring system 22, the monitoring system 22 may automatically instruct the household asset 30 (e.g., the smart outlet) to power off and/or actuate to simulate a household operation on behalf of one or more household occupants. The monitoring system 22 may instruct the household asset 30 without express input from the one or more household occupants. However, profiles of household occupants and/or households may be established and access by the monitoring system 22 and/or the community monitoring system 20 such that automatic operation and/or separate permissions may be defined for each household occupants and/or households.

Granularity of profiles may include room-level profiles and/or device-level profiles, where a particular household occupant and/or household may provide guidelines that define which rooms and/or devices may be automatically operated by the monitoring system 22 and which may use additional human approval before being operated by the monitoring system 22. In some embodiments, additional human approval may be household occupant approval and/or approval from a third-party operator (e.g., law enforcement, security detail). Furthermore, these profiles may define a sensitivity preference to define how and/or in what way some activities are responded to in response to being detected by the monitoring system 22. In some cases, granularity of profiles may include the ability to change scope of footage (e.g., the sensitivity preference) in response to an alert, such as wide camera angle used to capture footage in response to some activities being detected by the monitoring system 22. This may include the example where a first monitoring system 22 detects a break-in event and triggers an alert to be sent to a second monitoring system 22. The second monitoring system 22 may, in response to the alert, adjust its scope of footage, such as to capture a different scope of information in response to the activity detected by the first monitoring system 22.

Automatic response may also apply to cutover operations managed by the central control system 26. In this way, the central control system 26 may receive shared information that a monitoring system 22B has disconnected from its home network 30A due to a mechanical malfunction (e.g., router malfunctioning). The central control system 26 may automatically share a home network 30A from the monitoring system 22A with the monitoring system 22B. Sharing of the home network 30A may be performed and/or permitted via a variety of methods. For example, the central control system 26 may preemptively supply one or more networked monitoring devices 30B with login credentials for neighboring home networks 30A that may be used when conditions are met (e.g., a suitable combination of shared information is received to indicate that the sharing of home networks 30A is reasonable and not an attempt to bypass payments and/or bypass a maintenance of individual home networks 30A). As another example, the central control system 26 may maintain login credentials for the home networks 30A of the community monitoring system 20. In this way, when a monitoring system 22 loses its home network 30A and the central control system 26 determines that the sharing of home networks 30A is reasonable, the central control system 26 may facilitate the sharing of the home network 30A between monitoring systems 22 to end an outage (e.g., caused by mechanical malfunction, caused by loss of utility access, such as via the utility line being cut, or the like). The central control system 26 may share login credentials between the monitoring systems 22 and/or connect a first monitoring system 22 to a home network 30A of a second monitoring system 22 on behalf of the first monitoring system 22, automatically and without express input from any associated household occupants.

Furthermore, the central control system 26 may manage the shared information, may analyze the shared information, and may instruct respective devices associated with the household assets 30 to perform one or more operations in response to the shared information from the one or more monitoring systems 22. Examples of the operations include managing a cutover operation, contacting local security and/or policing personnel, changing an appearance of a household via the household assets 30 (e.g., opening or closing blinds, curtains, shutters, turning off lights, or other suitable household automation operations), or the like. As may be appreciated, the interconnectedness of the above-described system may permit a relatively robust community monitoring system 20 when compared to capabilities of a single monitoring system 22 operating without insight and/or information from neighboring or community-affiliated monitoring systems 22 (but otherwise considered third-party to an owner of the monitoring system 22). The central control system 26 may reference profiles of household occupants and/or households to determine how to use the shared information.

The central control system 26 may include one or more computing devices 34 communicatively coupled to one or more data stores 36. Each computing device 34 may include processing circuitry used to run programs, execute instructions, interpret inputs, generate control signals, and/or other similar functions. The data stores 36 may be used to store data, programs, instructions, and so forth. Recorded data sets (e.g., audio data, image data, video data, motion detection data, and/or additional sensor data) may be transmitted between components of the community monitoring system 20 via a communication network (e.g., represented by communicative couplings 24, 28, 32). The communication network may include any number of input/output (I/O) interfaces and/or network interfaces, despite not being expressly depicted in FIG. 1. Such a communication network may enable data transmission over a variety of wired or wireless networks between components of the community monitoring system 20. The wired or wireless networks may include networks such as a personal area network (PAN), Bluetooth, a local area network (LAN) or wireless local area network (WLAN), such as Wi-Fi, and/or for a wide area network (WAN), such as a cellular network.

Furthermore, the computing devices 34 may analyze recorded data sets from components of the community monitoring system 20, such as to glean additional information, to draw additional conclusions, to perform machine learning-based and/or artificial intelligence-based analysis techniques to the recorded data sets, or the like. For example, the computing devices 34 may analyze recorded data sets acquired by separate monitoring systems 22 but leverage the analysis of the separate data sets when determining how to response to a detected event. This may be manifested as pattern detecting analysis where data sets are compared to determine common patterns of events. It is noted that any suitable pattern detecting analysis may be performed on any number of recorded data sets. In the depicted example, the computing devices 34 may store the recorded data sets into the data stores 36 on behalf of the community monitoring system 20. However, it should be understood that any suitable process or system may be used to store recorded data set.

Figure 2:
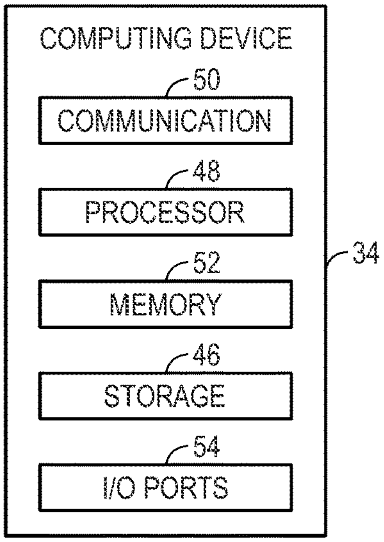
FIG. 2 is a block diagram of computing devices of FIG. 1, in accordance with embodiments of the present techniques.

To elaborate, FIG. 2 is a block diagram of an example computing device 34. The computing device 34 may include additional or fewer components as those depicted in FIG. 2. For example, the computing device 34 may omit storage 46 and instead use the data stores 36 shared between the computing devices 34. Furthermore, although described herein with reference to the computing devices 34, it should be understood that any of the computing devices, electronic devices, or the like of the community monitoring system 20 may include one or more of the systems and/or components described herein.

For example, the monitoring systems 22, the household assets 30, or the like, may each include a processor 48, a communication component 50, a memory 52, I/O ports 54, or the like. The communication component 50 may be a wireless or a wired communication component that facilitates communication between components of the monitoring system 22 (e.g., computing device 34 to monitoring system 22, monitoring system 22A to monitoring system 22B, monitoring system 22C to household asset 30, or the like), machines having communication functionalities, components having communication functionalities, or the like. The communication component 50 may permit communication using ultra-wide band wireless radio technology, or any suitable wireless communication used by devices of the community monitoring system 20. These wired or wireless communication protocols may include any (or use any) suitable communication protocol include Wi-Fi, mobile telecommunications technology (e.g., 2G, 3G, 4G, 5G, long term evolution (LTE) enabled devices), Bluetooth®, near-field communications technology, or the like. The communication component 50 may include a network interface to enable communication via various protocols such as EtherNet/IP®, ControlNet®, DeviceNet®, or any other suitable communication network protocol.

The processor 48 may be any suitable type of computer processor or microprocessor capable of executing computer-executable code, including but not limited to one or more field programmable gate arrays (FPGA), application-specific integrated circuits (ASIC), programmable logic devices (PLD), programmable logic arrays (PLA), and the like. The processor 48 may, in some embodiments, include multiple processors. The memory 52 may include any suitable article of manufacture that serves as media to store processor-executable code, data, or the like. The memory 52 may store processor-executable code used by the processor 48 to perform the presently disclosed techniques. The storage 46 may be relatively long-term memory storage for the processor 48 to store data over time. Finally, the I/O ports 54 may be any suitable input and/or output device that permits data packets to be transmitted into the computing device 34 and/or that permits data packets to be transmitted from the computing device 34. I/O ports 54 may include or be associated with any suitable Universal Serial Bus (UBS) port, registered jack port (e.g., RJ15, RJ11, or the like), any sort of antenna to receive wireless signals on, user input devices (e.g., keyboards, mouse, or the like), or the like.

As described above, owned information shared between devices of the community monitoring system 20 (e.g., respective monitoring systems 22, the central control system 26, respective household assets 30) may include a recorded data set (e.g., data recorded via one or more household assets 30), an alarm, an alert, a notification regarding unusual activity, a notification regarding nefarious activity, a notification regarding a utility service interruption, or the like. In some cases, the central control system 26 may aggregate at least a portion of the recorded data, the alarms, the alerts, any of the notifications, or any combination thereof, and use the aggregated monitoring data to determine whether an unusual activity, a nefarious activity, a utility service interruption, or the like is ongoing, previously happened, or the like. For example, the recorded data set(s) may be aggregated by the processor 48 into the storage 46, the memory 52, the data stores 36, or any combination thereof. The central control system 26 via the processor 48 may analyze the recorded data set.

In some embodiments, the recorded data set is transmitted and stored within the central control system 26 in-real time and/or in an otherwise ongoing basis. However, in some cases, the recorded data set is transmitted to the central control system 26 in response to a trigger event (e.g., an event, an alert, an activity, a threshold being exceeded or met, or the like). It is noted that the trigger event may correspond to a logical low signal, where the central control system 26 may interpret a lack of a signal (e.g., the logical low signal, "0") as an alert. Furthermore, in some embodiments, the monitoring system 22 may interpret a lack of an expected event or particular pattern as a trigger event. For example, a household occupant may consistently come home before 16:00 each evening. When the household occupant does not come home by 16:30 (or any defined threshold after an expected arrival time), the monitoring system 22 may determine abnormal behavior to be a trigger event. Thus, the monitoring system 22 may alarm in response to the detected abnormal behavior and/or transmit a recorded data set to the central control system 26. The alarm may cause a third-party (e.g., police, system provider) and/or household occupants to be contacted, such as via personal computing devices or via an e-mail.

Transmitting recorded data sets in response to trigger events protects privacy of parties associated with the monitoring system 22. Rather than transmitting owned information that may be inherently private and/or personal in nature on an ongoing basis with the central control system 26, portions of the own information are shared when sharing is deemed to improve monitoring of the community but not when sharing is deemed to not improve monitoring of the community. For example, sharing owned information may be performed when a response to the alert and/or the activity is expected to improve based on data gleaned from the owned information, when a monitoring operation of the monitoring system 22 is expected to improve based on data gleaned from the owned information, or the like.

Figure 3:
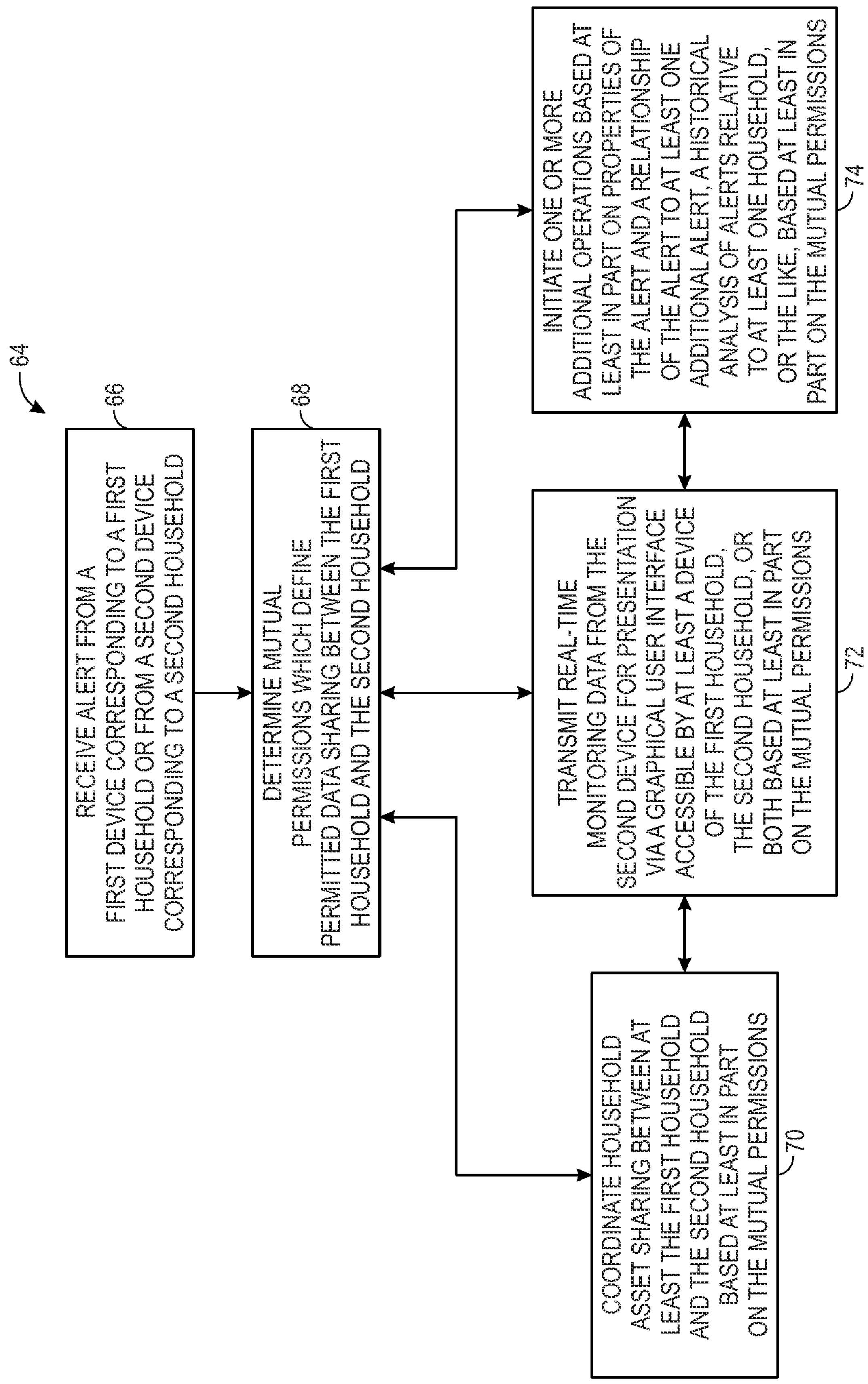
FIG. 3 is a flowchart for monitoring one or more monitored areas via the community monitoring system, in accordance with embodiments of the present techniques.

Recorded data set transmission is one example of an operation that may be facilitated between monitoring systems 22 via the central control system 26. FIG. 3 depicts additional examples of operations that may be facilitated via the central control system 26. FIG. 3 is a flowchart of a method 64 for monitoring one or more monitored areas via the central control system 26. Although described as performed by the central control system 26, it should be understood that any suitable computing device may perform, or facilitate performing, the method 64. It should be understood that although the method 64 is presented in a particular order, any suitable order may be used to perform the method 64. Furthermore, it should be understood that some or all of the performance of the method 64 may be facilitated by a processor executing instructions stored on a tangible, non-transitory memory or storage device (e.g., such as a processor 48 executing instructions stored in the memory 52).

With the above in mind, at block 66, the central control system 26 may receive an alert (e.g., a notification) from a first networked monitoring device 30B of a first monitoring system 22 and/or from a second networked monitoring device 30B of a second monitoring system 22. The first monitoring system 22 and the second monitoring system 22 may monitor separate areas, where the separate areas may be monitored by a same community monitoring system 20. The central control system 26 may aggregate the alert alongside other information, such as recorded data sets, additional alarms, additional alerts, or the like. The first networked monitoring device 30B and/or the second networked monitoring device 30B may generate the alert in response to detecting abnormal or unexpected activity (e.g., such as based on the particular function or operation of the networked monitoring device 30B), in response to a threshold number of access attempts into a secured portion of the monitoring system 22 (e.g., when the threshold is three, four wrong attempts to enter a password to enter a home may prompt an alert to be generated), or the like.

At block 68, the central control system 26 may determine mutual permissions associated with the alert, where the mutual permissions may define permitted data sharing between the first monitoring system 22 and the second monitoring system 22. Permissions may define when owned information may be shared, what type of owned information may be shared, when owned information may be shared, or the like, for a particular household and/or monitoring system 22. The permissions may also define when a particular household and/or monitoring system 22 wants to receive owned information from community or neighboring devices, what owned information to receive, or the like. The permissions may thus define which (or which portions of) recorded data sets are permitted to be shared between networked monitoring devices 30B, between monitoring systems 22, and/or with subscribers to a service operated by the common provider. Permissions of each monitoring system 22 may be established between the central control system 26 and the monitoring system 22, such as by way of agreement, contract, legal agreement, legal contract, user agreement, or the like. Additionally or alternatively, the permissions may be settings that may change over a lifetime and/or operation duration of the monitoring system 22, such as in response to a trigger event (e.g., a threshold number of locally-detected events) and/or in response to operator input. In this way, mutual permissions and/or permissions may be defined based at least in part on operator instruction and/or selection.

The central control system 26 may receive the permissions from each monitoring system 22 at a time of initialization, at a time when permissions are updated, at regular time intervals, in response to a probe of the monitoring systems 22 when a mutual permissions determination is to be made, or the like. In this way, each monitoring system 22 may be associated with operator permissions for data sharing with other devices within the community monitoring system 20. The central control system 26 may sometimes store permissions within the data stores 36 such that the permissions may be retrieved without communication with the monitoring systems 22. When permissions at least partially match, at least partially overlap, or are otherwise complimentary (thereby permitting mutual data sharing), the matching pair of permissions is referred to as mutual permissions. The central control system 26 may use the determined mutual permissions to determine at least a portion of the recorded data sets from the first monitoring system 22 to share with the second monitoring system 22, and vice versa. In some cases, the central control system 26 may determine via the mutual permissions that mutual access of monitoring system 22 to recorded data sets from video-enabled networked monitoring devices, audio-enable networked monitoring devices, camera-enabled networked monitoring devices, motion-detection monitoring devices, or any combination thereof is permitted. In these cases, the monitoring systems 22 may benefit, for example, from increased monitoring ranges or monitoring situations through which to detect abnormal or unexpected activity, or to use to detect patterns of activity or alerts.

The permissions may also be defined globally relative to two or more networked monitoring devices 30B of the monitoring system 22. In this way, a first networked monitoring device 30B of a first monitoring system 22 may have the same permissions as a second networked monitoring device 30B of the first monitoring system 22 defined via a same permission setting (but a third networked monitoring device 30B of a second monitoring system 22 may have different permissions than either of the first networked monitoring device 30B and/or second networked monitoring device 30B).

In response to determining the mutual permissions between the first and second monitoring systems 22, the central control system 26 may perform any subset or each of the operations described at blocks 70, 72, and 74. For example, at block 70, the central control system 26 may coordinate household asset 30 sharing between monitoring systems 22 based at least in part on the mutual permissions.

Sharing of household assets 30 may include sharing of an internet utility via home network 30A. For example, the alert received at block 66 may be associated with the second monitoring system 22 detecting a loss of the home network 30A (e.g., internet utility interrupted because of weather-based issues, nefarious operations, maintenance-based issues, or the like). In response to receiving the alert, the central control system 26 may determine whether suitable mutual permissions between the first monitoring system 22 and the second monitoring system 22 exist to permit sharing of the home network 30A between the monitoring systems 22. When suitable mutual permissions exist, the central control system 26 may coordinate a temporary sharing of router login credentials (e.g., a password and/or a username), a cutover operation to physically couple the wired connection of the second household to the wired connection of the first household to share a wired network service (e.g., Digital Subscriber Line (DSL)), or the like.

It should be understood that cutover and/or temporary sharing operations should not be limited to internet utilities. The central control system 26 (provided there are suitable mutual permissions and/or suitable infrastructure between monitoring systems 22) may permit the monitoring systems 22 to share a power and/or electricity utility 30C, a water utility 30C, mutual sharing of partial recorded data sets, mutual sharing of full recorded data sets (e.g., full as in for all time in operation or for a specified duration of time), one-way sharing of at least a portion of recorded data sets, or the like. This may improve a resiliency of the monitoring system 22 to inconvenient operation or nefarious threats (e.g., a thief who intentionally terminates an internet utility, such as to disable the electronic monitoring devices of the first monitoring system 22), since a loss of connectivity of the utility 30C is adverted.

Keeping this in mind, the relationship between the central control system 26 and each monitoring system 22 may permit a variety of permutations. For example, a monitoring system 22 may provide permission to share portions of a recorded data set corresponding to a specific alert, a determined alert pattern, and/or a determined behavior pattern, without permitting the full recorded data set to be shared with each monitoring system 22. Furthermore, the permissions for a respective monitoring system 22 may specify to the central control system 26 which monitoring systems 22 to share owned information with and which monitoring systems 22 to share subsets (or portions) of the owned information with. A portion or subset of the owned information may be isolated from the owned information by the central control system 26, and be intended to correspond to a specific alert, a determined alert pattern and/or a determined behavior pattern, or the like, based on the permissions defined for the monitoring system 22 that generated the owned information. Additionally or alternatively, there may be a case where the permissions of a first monitoring system 22 permits a data set of owned information to be shared with a second monitoring system 22 but the permissions of the second monitoring system 22 permits to receiving the data set of owned information from the first monitoring system 22 without permitting to transmission of its generated data set of owned information.

Additionally or alternatively, at block 72, the central control system 26 may transmit real-time monitoring data from the second networked monitoring device 30B for presentation via a graphical user interface (GUI). The GUI may be accessible by at least a device corresponding to the first monitoring system 22 and/or a device corresponding to the second monitoring system 22, based at least in part on the mutual permissions. For example, the first monitoring system 22 may render least a portion of recorded data set on a GUI for viewing or analysis with recorded data from the second monitoring system 22. In this way, the mutual permissions define the extent to which recorded data sets, or real-time monitoring data (e.g., a video feed transmitted in real-time, an audio recording transmitted in real-time, or the like), are shared to devices (e.g., personal computing devices, cellular devices, handheld devices, or the like) for viewing by operations or members of the respective households. For example, mutual permissions may enable audio data recorded in association with the alert from the second monitoring system 22 to be transmitted and presented to a device corresponding to the first household (e.g., associated with the first monitoring system 22). This sharing may provide one or more members of the first household additional information and/or context for the alert received at block 66. For example, in response to the central control system 26 receiving the alarm and determining permissions were mutual, a video-enabled doorbell of the first monitoring system 22 may have its real-time video stream be provided to a device of the second monitoring system 22 via the central control system 26. In some embodiments, shared owned information between households may be shared with a trusted, third-party device. The trusted, third-party device may facilitate presentation via a graphical user interface (e.g., where the owned information is accessible via a website, application, software portal or the like, without the monitoring system 22 and/or parties that do not own the information having access to recorded data sets, data files, or the like, therefore promoting privacy of the owners of the owned information). In some cases, the third-party device may correspond to that of a home owners association. It is noted that sharing owned information and/or household assets 30 may permit one or more computing devices (e.g., networked monitoring device 30B or other suitable computing devices) of each household communicatively coupled to the central control system 26 (e.g., directly, via a monitoring system 22, via a software application that displays or presents one or more data sets maintained by the central control system 26) to use, interpret, access, view, or the like, the owned information permitted (e.g., permitted based on permissions and/or conditions) to be shared with the computing devices.

Additionally or alternatively, at block 74, the central control system 26 may initiate one or more additional operations based at least in part on properties of the alert and a relationship of the alert to at least one additional alert, a historical analysis of alerts relative to at least one household, or the like, based at least in part on mutual permissions. The additional operations may be associated with an enhanced response (or enhancing a response) to the alert based at least in part on an analysis of the recorded data set. The central control system 26 may perform pattern detection at the block 74. In this way, the central control system 26 may compare properties of the alert to properties of one or more other alerts to determine whether a pattern of alerts is present. Properties of the alerts may include a header file for the alert (e.g., the data packet of the alert), a name of the alert, the originating device of the alert, a context of the alert (e.g., how or why did was the alert initiated), a time of generation of the alert, a severity of the alert (e.g., a severity assigned to the alert such as by the networked monitoring device 30B, or by any suitable other device), or the like. Alerts may be compared relative to alerts from a same networked monitoring device 30B at a different time, to alerts from a different networked monitored device 30B at a same time, and/or to alerts from a different networked monitoring device 30B at a different time, or the like.

In a similar manner, the central control system 26 may additionally or alternatively compare properties between recorded data sets to determine whether a pattern is present. For example, the recorded data sets may be associated with one or more of the following properties: file name, date of recording, time frame of recording, recording device, device brand or proprietary owner, content of the recording, whether a portion of the recording corresponds to at least one alert, or the like. Properties of the aggregated data may be analyzed over time and/or between systems by the central control system 26 to detect patterns. Furthermore, a recorded data set may be compared relative to historical data logs (e.g., historical logs of recorded data set(s)). The historical data logs may be stored by the central control system 26 in the data stores 36. When patterns are detected between alerts and/or recorded data sets (or portions of recorded data sets), a priority of respective alerts or alarms may be elevated in response to the detected pattern.

For example, the central control system 26 may receive a second alert in addition to a first alert. The central control system 26 may determine whether one or more properties of the second alert are substantially similar to a property of the alert and/or an alert from an alert-data correlation data set (e.g., a historical log that associates recorded data with generated alerts). In response to finding a match, a pattern, and/or a correlation between the various alerts, the central control system 26 may elevate a priority of the second alert and/or a priority of one of the other alerts. Furthermore, the central control system 26 may notify the first monitoring system 22 of the elevated priority of the alerts.

In some embodiments, the central control system 26 may generate control signals (e.g., in response to pattern detection and/or receiving owned information from a monitoring system 22) to cause one or more networked monitoring devices 30B to initiate recording operations and/or other suitable operations. The central control system 26 may generate the control signals in response to receiving notification from one of the monitoring systems 22 of an unexpected and/or nefarious activity (e.g., receiving an alert), in response to analysis results being generated which indicate emergence of an alert pattern and/or a behavior pattern, or the like. Furthermore, in some cases, one of the monitoring systems 22 that receives a recorded data set, or a portion of a recorded data set, may interpret that incoming data as a control signal to initiate recording operations.

For example, a portion of a recorded data set of the first monitoring system 22 may be shared with one or more networked monitoring devices 30B of the second monitoring system 22. The networked monitoring device 30B of the second monitoring system 22 may respond to the received portion of the recorded data sets, such as by initiating recording operations, performing an operation (e.g., actuating a switch, initiating an alarm, calling local policing officials, or the like). The second monitoring system 22 may respond without consideration of device brand, device type, permission of a particular service operator (e.g., original device manufacturer of the networked monitoring device 30B), or the like.

Figure 4:
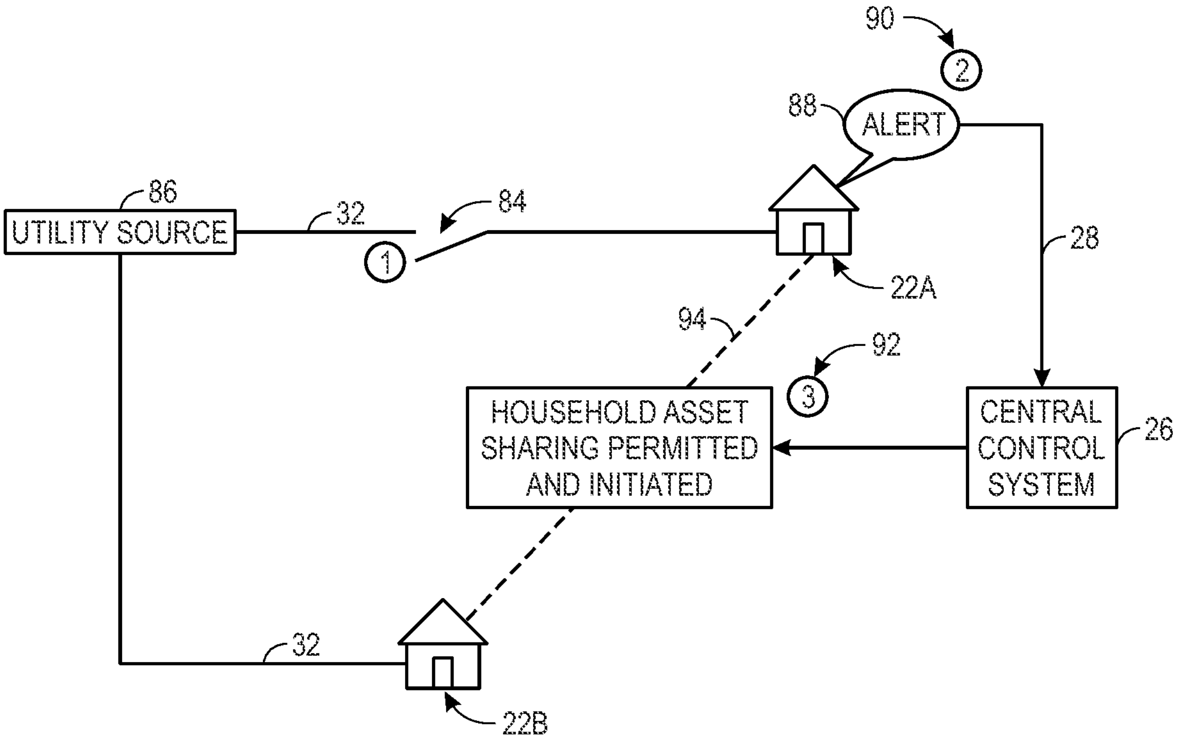
FIG. 4 is a schematic diagram of an example cutover operation performed by the community monitoring system, in accordance with embodiments of the present techniques.

To help visualize the method 64, FIG. 4 is a schematic diagram of an example cutover operation performed by the community monitoring system 20 based at least in part on the method 64. In this exemplary operation, operations are going to be described as being performed in a particular order. As mentioned above, the operations may be performed in any particular, and suitable, order. Thus, at a first time (e.g., circle 1 at reference 84), something causes an interruption to a utility. For example, a first household associated with the first monitoring system 22A may have its Internet (e.g., home network 30A from FIG. 1) interrupted when the first household loses its communicative coupling 32 to the internet utility source 86.

When the first household loses its Internet (e.g., home network 30A), the first monitoring system 22A may generate an alert 88 (e.g., circle 2 at reference 90). The alert 88 may indicate to the central control system 26 that the first household lost its internet connection. The first monitoring system 22A may transmit the alert 88 via communicatively coupling 28 to the central control system 26. This alert 88 may correspond to a logical low signal, where the central control system 26 may interpret a lack of a signal as the alert 88. Additionally or alternatively, the central control system

26 may ping devices of the monitoring systems 22 to determine whether or not an alert was generated, is ongoing, or the like. Furthermore, the central control system 26 may ping devices of the monitoring systems 22 to monitor home network 30A conditions, verify that each device continues to have connectivity to the community monitoring system 20 and/or its respective home network 30A, or the like.

In response to receiving the alert 88, the central control system 26 may determine that household asset sharing (e.g., sharing of household assets 30 from FIG. 1 between monitoring systems 22 and/or households corresponding to monitoring systems 22) is permitted (e.g., circle 3 at reference 92) based at least in part on the permissions mutual to the first household and the second household. In response to determining that the household asset sharing is permitted, the central control system 26 may perform the cutover operation to provide the utility from the second household to the first household (e.g., represented by temporary communicatively coupling 94). The cutover operation may include operating a switch, performing a configuration change, or the like, to permit failover from an inactive connection to an active connection of the other household. For example, the central control system 26 may provide login credentials to one or more devices of the first monitoring system 22 (or manage a connecting to the other home network 30A on behalf of the one or more devices) to permit the one or more devices to access the home network for the second monitoring system 22, or the like.

In another example, the cutover operation may include the central control system 26 changing settings on a smart device central to two home networks 30A (e.g., such as indicate to the smart device that it is time to failover from one home network 30A to another). In response to the changing of the settings, the smart device may permit coupling of the one or more devices coupled to a first home network 30A to a second home network 30A. The smart device may receive network login credentials from the one or more devices of the first home network 30A to authenticate that the one or more devices are permitted to access the first home network 30A. In response to authenticating, the smart device may couple the one or more devices to the second home network 30A without having to provide the login credentials of the second home network 30A to the one or more devices. This may maintain security and/or privacy associated with the second home network 30A since a third-party owned smart device may manage the failover connection between home networks 30A independent of operator intervention and/or independent of changing configuration settings of the one or more devices.

In one embodiment, at block 66, the central control system 26 receives the alert from one or more of the monitoring systems 22. For example, the monitoring system 22 may transmit the alert in response to receiving a threshold number of alerts from one or more networked monitoring devices 30A. Furthermore, the monitoring system 22 may include a device capable of performing local analysis of recorded data sets such that the monitoring system may be able to monitor expected activity or operations (e.g., known patterns) change subtly overtime to better anticipate when a detected activity is or is not expected or abnormal.

In some cases, the central control system 26 may probe one or more of the monitoring systems 22 for locally-stored alert and/or recorded data sets. In this way, data received by the central control system 26 may be a subset of owned information generated by the monitoring systems 22. The central control system 26 may, for example, probe a monitoring system to extract recorded data sets corresponding to a particular time or detected activity. This information to be used in probing may be derived from owned information initially transmitted to the central control system 26.

In some embodiments, hardwired utility couplings may interconnect the households of the monitoring systems 22 (similar to how communicative couplings 24 are depicted in FIG. 1). In this way, if an event causes a utility 30C supplied to a first household of the community monitoring system 20 to no longer be supplied, the central control system 26 may permit a utility 30C supplied to an additional household of the community monitoring system 20 to provide a failover utility supply to the first household. The central control system 26, for example, may actuate a switch that permits a water utility and/or a power utility (e.g., utility 30C) to be temporarily shared between households until a repair to enable the utility 30C to be supplied to the first household again. This may maintain security of a monitoring system 22 since this helps to decrease a chance of a monitoring outage due to loss of a power utility 30C.

An example use case of the techniques described herein may include detecting abnormal behavior within a community monitoring system 20 and notifying a home owner that does not own a monitoring system 22 about the abnormal behavior via accessing the central control system 26 (which may be accessible via a software application and/or website) and/or receiving a communication from the central control system 26 (e.g., a phone call, an e-mail, a post or notification, a website, a website-hosted application, or the like). In this way, the home owner or community member that does not own a monitoring system 22 may benefit from recorded data sets (as long as other members and/or monitoring systems 22 of the community monitoring system 20 permit to sharing the recorded data sets). In some embodiments, notifications may be transmitted to owners and/or operators of a community monitoring system 20 via home automation devices and/or home automation speakers (e.g., Alexa devices). Furthermore, in some embodiments, local news highlights or stories may be associated with recorded data sets via the central control system 26. For example, nearby protesting behavior may be corresponded to one or more abnormal behavior within the community monitoring system 20 (e.g., increase in detected traffic on a street, increase in video-enabled doorbells detecting passersby, or the like). The determination that a local news story affects behavior within the community monitoring system 20 may trigger the central control system 26 to alert and/or notify members and/or monitoring systems 22 of the community monitoring system 20. It is noted that, in some embodiments, the central control system 26 may transmit local news highlights or stories to alert and/or notify members and/or monitoring systems 22 of the community monitoring system 20 without prompting via a trigger, and merely in response to there being a news highlight to share with members and/or monitoring systems 22 (which may be controlled or performed in tandem to permissions of the monitoring systems and/or household, such as to limit news highlights shared to just emergency-related news highlights, or news highlights related to a geo-location from the community monitoring system 20). In a similar way, a missing person report may trigger the central control system 26 to alert and/or notify members and/or monitoring systems 22 of the missing person report. This alert may cause the monitoring systems 22 to adjust monitoring operations, such as to monitor a street and/or transmit data associated with monitoring of the street (e.g., to aid in tracking of a vehicle associated with the missing period report).

In some cases, the data gathered by the community monitoring system 20 may leveraged to drive behavior within the communities when permitted by permissions and/or profiles of household occupants and/or households. By showing homeowners and business owners an impact of their action on the "herd immunity" of the community, purchasing patterns may be altered. For example, community members may be presented with alerts and corresponding fidelity of the alerts alongside an indication of improvement they may anticipate from adding additional monitoring devices into their own monitoring system 22 (e.g., "alert fidelity is 38% but may be improved up to 75% if you purchase a video-enabled doorbell"). The purchase recommendations may sometimes be shared with third-party advertisers, retailers, or the manufacturers (e.g., third-party organizations). The third-party organizations may use the data gathered to determine targeted advertisements to provide the household occupants and/or households. The targeted advertisements may be supplied as a technique to prime household occupants and/or households for the product, such that when the purchase recommendation is provided, the household occupant is more ready to purchase.

Although described with respect to a first household that uses a first monitoring system and that neighbors a second household that uses a second monitoring system, where both are coupled to a central control system, many variations apply. For example, any of the monitoring systems may include sub-monitoring systems. A sub-monitoring system may be subjected to some of the same permissions as its corresponding monitoring system. However, there may be some instances where a sub-monitoring system has stricter and/or less strict permissions. For example, a household may use a first monitoring system having a first level of permissions and the first monitoring system may include a second monitoring system as a sub-monitoring system to monitor a play house for children, where the second monitoring system may have stricter sharing permissions and/or more request aggressive abnormal behavior responses.

In some cases, a trusted neighbor device may be assigned to a monitoring system and/or to a first household. When abnormal behavior is detected, the trusted neighbor device may be notified in addition to household member devices. The trusted neighbor device may be defined for a duration of time, such as a duration of time that corresponds to members of the household being away on vacation or otherwise unable to respond to abnormal behaviors. For example, when the monitoring system detects that an animal associated with the first household has escaped and/or when the first household receives a package, the monitoring system may alert the trusted neighbor device for event resolution.

Furthermore, in some cases, a first monitoring system 22 may detect property being stolen and/or an attempted break in of property, and report this detection to a second monitoring system 22 and/or the central control system 26. The second monitoring system 22 may cause a dashboard camera monitoring system of a vehicle to begin monitoring in response to the report from the first monitoring system 22. Furthermore, in some cases, the property that is stolen may include a monitoring device. Once the property detects it is stolen, data captured from the monitoring device may be transmitted to devices associated local policing groups for real-time reporting. For example, when the property is a vehicle, the vehicle may include a dashboard camera as the monitoring device, and may transmit image data from the dashboard camera to a local policing group to report the theft.

Thus, technical effects of the present disclosure include techniques for improved monitoring systems. These techniques describe systems and methods for aggregating owned information via a central control system. Over time, as alerts are received and/or patterns are detected, the central control system may reference permissions between monitoring systems to determine portions of the aggregated owned information to share between monitoring systems. Moreover, in some embodiments, sometimes utility cutover operations may be permitted between monitoring systems. These techniques may increase a robustness of a monitoring system by coupling individual monitoring systems into a community-wide monitoring system, where owned information and/or household assets are selectively shared between relevant parties based at least in part on real-time determinations.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A security sharing system, comprising:

a first monitoring system associated with a first set of data sharing permissions; and a central control system configured to:

receive a first alert, wherein the first alert indicates that an abnormal event, nefarious event, or otherwise detectable operation was detected via the first monitoring system;

probe the first monitoring system for a locally-stored historical alert log associated with a current time in response to receiving the first alert;

associate the locally-stored historical alert log with a larger data set associated with the first alert to generate an alert-data correlation data set;

save, in a data store, the alert-data correlation data set;

receive a second alert;

determine whether a second one or more properties of the second alert are substantially similar to a first one or more properties of at least one respective alert from the alert-data correlation data set;

elevate a priority of the second alert and a priority of the at least one respective alert in response to determining that the second one or more properties and the first one or more properties are substantially similar between the second alert and the at least one respective alert; and notify the first monitoring system of the elevated priority of the at least one respective alert.

2. The security sharing system of claim 1, wherein the first monitoring system is associated with a first set of data sharing permissions, and wherein the central control system is configured to:

determine a permission based at least in part on the first set of data sharing permissions;

determine that sharing a recorded data set from the first monitoring system associated with the first alert is permitted based at least in part on the permission; and share the recorded data set at least in part by transmitting the recorded data set from the first monitoring system.

3. The security sharing system of claim 2, wherein the recorded data set comprises a subset of recorded data from a larger data set, and wherein the central control system is configured to separate the subset of recorded data from the larger data set based at least in part on the permission.

4. The security sharing system of claim 2, comprising a second monitoring system associated with a second set of data sharing permissions, wherein the first monitoring system and the second monitoring system are configured to monitor separate households, and wherein at least the first set of data sharing permissions are defined via an agreement between the first monitoring system and the central control system.

5. The security sharing system of claim 2, wherein the first monitoring system is configured to transmit the recorded data set to a second monitoring system via the central control system.

6. The security sharing system of claim 1, wherein the otherwise detectable operation corresponds to a motion detector sensing motion associated with an animal escaping, a package being delivered, or both an animal escaping and a package being delivered.

7. The security sharing system of claim 1, wherein the central control system is configured to extract a recorded data set associated with the first alert from a data set on behalf of the first monitoring system based on a current time.

8. The security sharing system of claim 1, wherein the determining whether the second one or more properties of the second alert are substantially similar to the first one or more properties of at least one respective alert from the alert-data correlation data set comprises comparing at least one property of the second alert with at least in property of an alert from a different monitoring device.

9. The security sharing system of claim 1, wherein the first monitoring system is configured to initiate a recording operation in response to the notification of the elevated priority of the at least one respective alert.

10. A method, comprising:

receiving a first alert regarding a first monitoring system, wherein the first alert indicates that an abnormal event, nefarious event, or otherwise detectable operation was detected via the first monitoring system;

probing the first monitoring system for a locally-stored historical alert log associated with a current time in response to receiving the first alert;

associating the locally-stored historical alert log with a larger data set associated with the first alert to generate an alert-data correlation data set;

saving, in a data store, the alert-data correlation data set;

receiving a second alert;

determining whether a second one or more properties of the second alert are substantially similar to a first one or more properties of at least one respective alert from the alert-data correlation data set;

elevating a priority of the second alert and a priority of the at least one respective alert in response to determining that the second one or more properties and the first one or more properties are substantially similar between the second alert and the at least one respective alert; and notifying the first monitoring system of the elevated priority of the at least one respective alert.

11. The method of claim 10, wherein the determining whether the second one or more properties of the second alert are substantially similar to the first one or more properties of at least one respective alert from the alert-data correlation data set comprises comparing at least one property of the second alert with at least in property of an alert from a different monitoring device.

12. The method of claim 10, comprising:

determining a permission based at least in part on a first set of data sharing permissions associated with the first monitoring system;

determining that sharing a recorded data set from the first monitoring system associated with the first alert is permitted based at least in part on the permission; and sharing the recorded data set at least in part by transmitting the recorded data set from the first monitoring system.

13. The method of claim 12, wherein the at least a portion of the recorded data set comprises an image, video-recording, audio-recording, or any combination of the image, the video-recording, and the audio-recording, corresponding to the first alert.

14. The method of claim 12, comprising storing at least the first set of permissions into a data store such that the first set of permissions is able to be retrieved without communication with the first monitoring system.

15. The method of claim 12, comprising sharing the at least a portion of a recorded data set associated with the first alert with a second monitoring system, wherein the second monitoring system is configured to render the at least a portion of the recorded data set on a graphical user interface.

16. A system, comprising:

a first monitoring system; and a control system configured to:

receive a first alert regarding the first monitoring system, wherein the first alert indicates that an abnormal event, nefarious event, or otherwise detectable operation was detected via the first monitoring system;

probe the first monitoring system for a locally-stored historical alert log associated with a current time in response to receiving the first alert;

associate the locally-stored historical alert log with a larger data set associated with the first alert to generate an alert-data correlation data set;

save, in a data store, the alert-data correlation data set;

receive a second alert;

determine whether a second one or more properties of the second alert are substantially similar to a first one or more properties of at least one respective alert from the alert-data correlation data set;

elevate a priority of the second alert and a priority of the at least one respective alert in response to determining that the second one or more properties and the first one or more properties are substantially similar between the second alert and the at least one respective alert; and notify the first monitoring system of the elevated priority of the at least one respective alert.

17. The system of claim 16, comprising a second monitoring system associated with a neighbor device, and wherein the control system is configured to:

determine that the neighbor device is assigned to the first monitoring system based on permissions of the first monitoring system; and notify the second monitoring system of the elevated priority of the at least one respective alert.

18. The system of claim 16, comprising a second monitoring system associated with a second set of data sharing permissions, wherein the first monitoring system and the second monitoring system are configured to monitor separate households, and wherein at least a first set of data sharing permissions are defined via an agreement between the first monitoring system and the control system.

19. The system of claim 16, wherein the control system is configured to notify a household member device associated with the first monitoring system of the elevated priority of the first alert.

20. The system of claim 16, wherein the first monitoring system is configured to initiate an alarm in response to the notification of the elevated priority of the at least one respective alert.

* * * * *